US005135352A

United States Patent [19]

Scata et al.

[11] Patent Number: 5,135,352

[45] Date of Patent: Aug. 4, 1992

[54] DEVICE FOR EDGEWISE STACKING FLAT SINGLE OBJECTS FROM A BELT CONVEYOR SYSTEM OR THE LIKE INTO A CONTAINER OR A FIXED OR MOBILE STACKING SYSTEM

[75] Inventors: Mario Scata; Adolfo Passero, both of Teramo, Italy

[73] Assignee: Alcatel Face Societá per Azioni, Milan, Italy

[21] Appl. No.: 771,841

[22] Filed: Oct. 2, 1991

Related U.S. Application Data

[63] Continuation of Ser. No. 472,396, Jan. 30, 1990, abandoned.

[30] Foreign Application Priority Data

Jan. 30, 1989 [IT] Italy ............................ 20498/89[U]

[51] Int. Cl.⁵ ............................................ B65G 57/08

[52] U.S. Cl. ................................ 414/798.8; 53/542; 271/217; 271/306; 414/788.9; 414/794.4; 414/926

[58] Field of Search .................. 53/542; 271/215, 217, 271/306; 414/788.9, 794.4, 798.8, 926

[56] References Cited

U.S. PATENT DOCUMENTS

| | | | |
|---|---|---|---|
| 3,006,640 | 10/1961 | Keilig | 271/207 |
| 3,888,363 | 6/1975 | Erekson | 414/794.4 X |
| 3,890,764 | 6/1975 | Hartman | 53/542 X |
| 3,937,456 | 2/1976 | Gruodis et al. | 271/278 |
| 4,238,066 | 12/1980 | Brooke | 414/788.9 X |
| 4,356,682 | 11/1982 | Mancini | 53/542 X |
| 4,518,160 | 5/1985 | Lambrechts et al. | 53/542 X |

FOREIGN PATENT DOCUMENTS 3017612 11/1981 Fed. Rep. of Germany ... 414/794.4

*Primary Examiner*—David A. Bucci
*Assistant Examiner*—Janice Krizek
*Attorney, Agent, or Firm*—Christie, Parker & Hale

[57] ABSTRACT

A device for edgewise stacking flat single objects such as letters from a belt conveyor system or the like into a container or a fixed or mobile stacking system utilizes a moving container mounted on its side in front of an output module of a sorting system and moving downwardly at a controlled rate. The container is inclined relative to the vertical and the sorted objects are guided into the container by an inclined flat bottomed chute having a single rib at its lower edge, whereby the objects are flatwise stacked into the container. When the container is then turned upwards, the objects (letters) are stacked edgewise and their orientation and face are maintained.

12 Claims, 2 Drawing Sheets

DEVICE FOR EDGEWISE STACKING FLAT SINGLE OBJECTS FROM A BELT CONVEYOR SYSTEM OR THE LIKE INTO A CONTAINER OR A FIXED OR MOBILE STACKING SYSTEM

CROSS-REFERENCE TO RELATED APPLICATIONS

This is a continuation of application Ser. No. 07/472,396, filed Jan. 30, 1990, now abandoned.

TECHNICAL FIELD

The present invention relates to a device for edgewise stacking flat single objects, particularly letters, coming from a belt conveyor system or the like, into a container or a fixed or mobile stacking system.

CLAIM FOR PRIORITY

This application is based on and claims priority from an application first filed in Italy on Jan. 30, 1990 under Ser. No. 20498-B/89.

BACKGROUND ART

The single objects, exiting from the conveyor system through a belt, a cross-point module or a chute, are stacked in a container positioned therebelow.

The stacking of the objects within the container, in the known sorting systems, normally occurs flatwise, namely the objects are stacked one above the other.

DISCLOSURE OF INVENTION

The object of the present invention is to provide a stacker of the kind referred at the beginning, for edgewise stacking flat objects, particularly letters, within a container with a predetermined orientation of the face of the letters (address position, stamping, etc.).

This offers the advantage of facilitating the subsequent mail handling operations.

Another object of the present invention is to provide a stacker of the kind referred to at the beginning that is simple and nevertheless allows an edgewise stacking of the objects within the container without sacrificing the stacking speed.

The above mentioned objects are obtained by a device for edgewise stacking flat single objects from a belt conveyor system or the like into a container or a fixed or mobile stacking system, said device having the features as set forth in the attached claims.

BRIEF DESCRIPTION OF DRAWINGS

The disclosure will be better understood from the following description of an embodiment taken in conjunction with drawings attached, as an indicative and therefore not limitative example, in which.

BEST MODE FOR CARRYING OUT THE INVENTION

Figure 1:
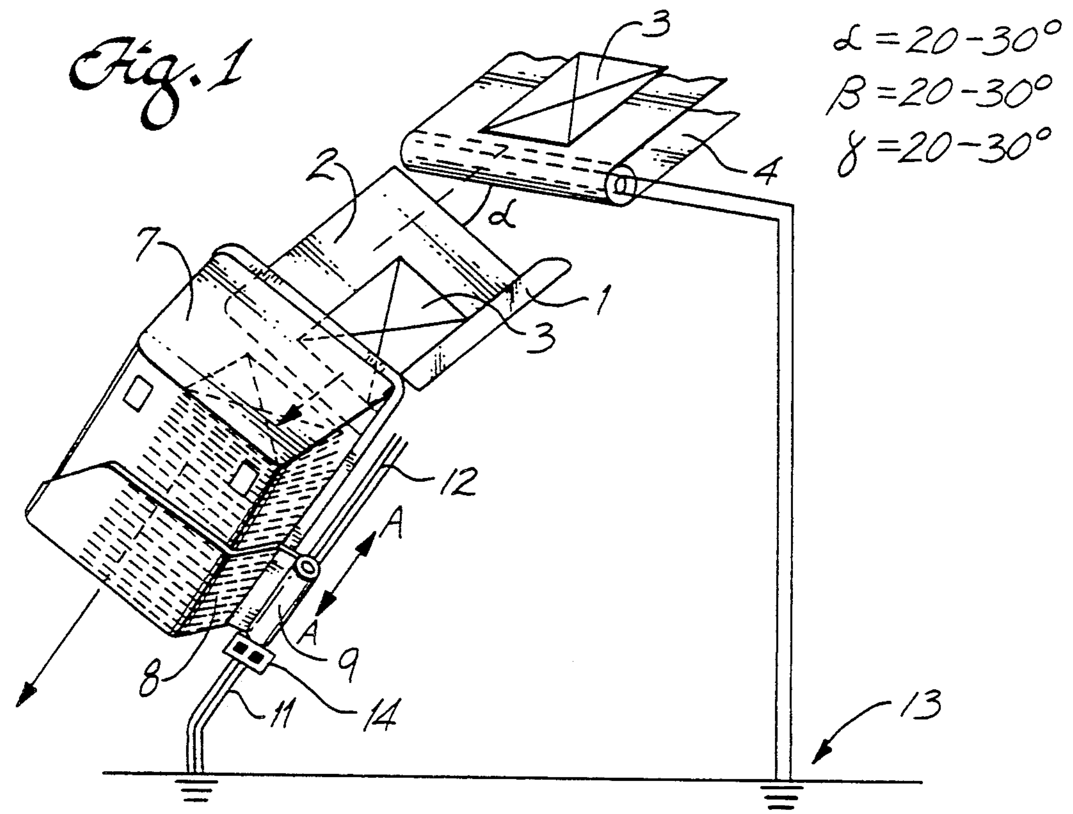
FIG. 1 is a schematic overall view of a fixed stacker according to the invention.

With reference to the figures, the device of the present invention consists essentially of a flat bottomed chute 2 formed by a rectangular plate provided, along its longitudinal edge, with a reference rib projecting upwards. Said plate, attached to the main chassis of the system, is arranged opposite to the outlets 4,5 of the conveyor system and suitably inclined laterally towards rib 1 at an acute angle $\alpha$ between 20° and 30° and angled downwardly towards the container 7 at an acute angle $\beta$ between 20° and 30°.

Downstream of the flat bottomed chute 2 there is provided a mobile support, consisting of a bearing bracket 8 suitably inclined rearwardly at an acute angle $\gamma$ between 20° and 30° from the vertical, designed to house the container 7 in the loading position.

Figure 2:
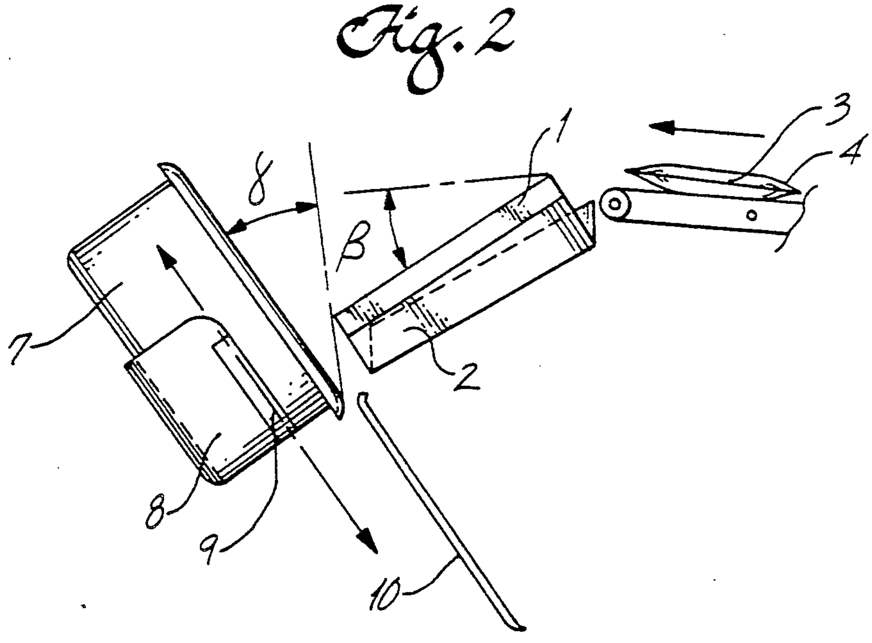
FIG. 2 shows schematically the device of FIG. 1 in a side view.

Conventional means 14 are connected to the bracket 8 to move this latter, and therefore the container, back and forth along an inclined feed traverse direction, as indicated by arrows A—A in FIGS. 1 and 2.

The bracket 8 is provided externally with a shaped guide 9 which, during the forward feed motion (downwards) and reverse feed motion (upwards) of the container, slides in a groove 12 of a column 11 rigidly fixed to the frame 13 of the conveyor system.

Figure 1A:
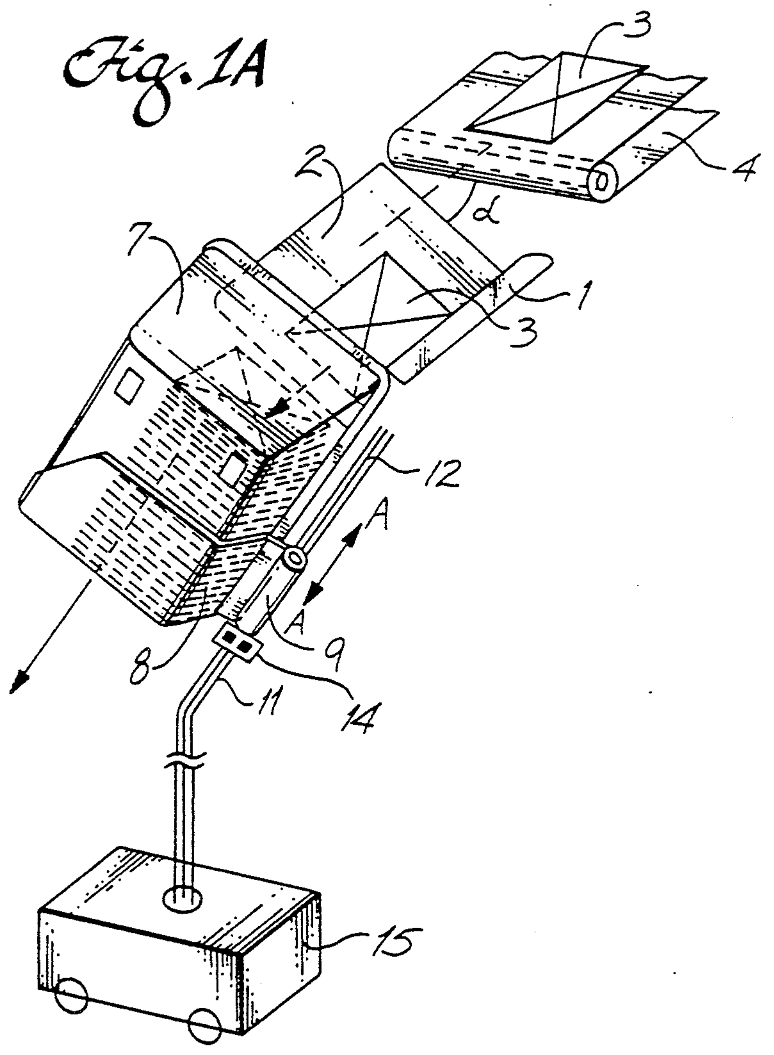
FIG. 1A shows a mobile alternative to the fixed stacker of FIG. 1.

Alternatively, as shown in FIG. 1A, the bracket 8, the column 11 and the means for translating the container 14 be part of a stacking system that is physically separate from the frame of the conveyor system.

In that case, the bracket, column and means for translating the container are preferably fixed to a mobile carriage 15 to facilitate the replacement of the container itself.

The operation of a preferred embodiment of a stacker constructed in accordance with the invention will now be described.

Figure 3:
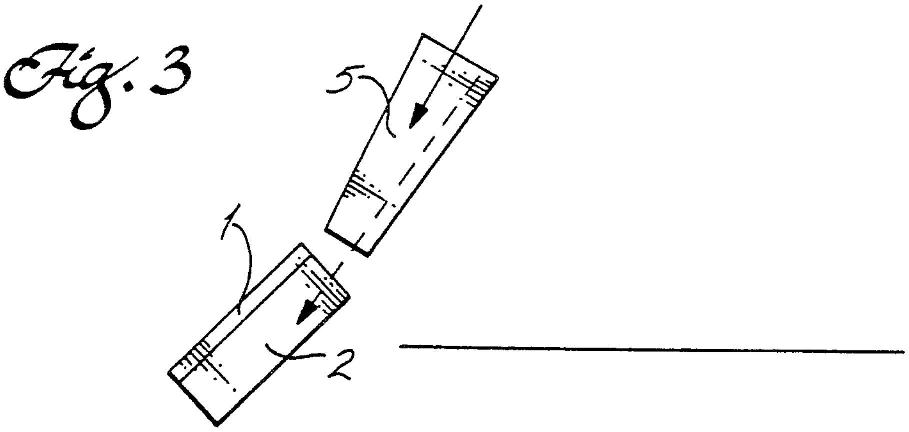
FIG. 3 shows a detail of the device in FIG. 1, where the outlet of the conveyor system is a chute.

The object to be stacked (such as letter 3), coming from an output module 4 (see FIG. 1) or chute 5 (see FIG. 3) of a belt conveyor system or similar, is launched on the suitably positioned and inclined flat bottomed chute 2, whereby thanks to the combined action of the motion component of the object and of gravity, the object is forced to conclude its trajectory in contact with two adjacent surfaces the container, which form a reference dihedral angle, without regard to the dimensions of the object (within certain limits). Obviously, these faces forming the reference dihedral angle are constituted by the bottom of the container arranged with its opening facing the advancing object and inclined rearwardly (in the sense of the object motion) with respect to the vertical and by the lateral face of the sidewall which is located adjacent reference rib 1 (see FIG. 1).

The rearward and lateral inclination of the container with respect to the vertical, helps the positioning of the object against the reference dihedral angle.

A plate 10 arranged in front of the opening of the container (see FIG. 2) forms, upon downward motion of the container, a protection step so as to avoid the ejection due to rebound of the stacked objects.

While the objects are stacked, the container is gradually moved downwards in a known, conventional and electronically controlled manner until the complete filling of the container is over.

Then, a particular signal alerts the operator that the container (or the carriage) is to be replaced.

During such replacement, a proper control sends the objects in overflow.

From what has been set forth, it is evident that the present invention achieves the objects mentioned at the outset.

Indeed, thanks to the combined action of:

gravity, the proper positioning of the flat bottomed chute, and the electronically controlled gradual motion of the container, the alignment of the objects in a predetermined orientation and their stacking, one above the other, at a very high speed, are achieved.

Of course, once the container is laid on its bottom, the objects appear as edgewise stacked and, in case of letters, both orientation and face are maintained, thus facilitating subsequent manual handling.

However, it is understood the above description has been made by way of example and not as a limitation, whereby the materials, the dimensions and the manufacturing details may change according to the objects and to production and use requirements and contingencies, always complying with the features illustrated, described and hereinbelow claimed.

We claim:

1. Device for edgewise stacking flat single objects advancing in various orientations from an outlet of a conveyor system towards a removable container in which the articles are to be stacked, said stacking device comprising:

support means, located in front of said outlet, for removably mounting said container in a sideways loading position with an opening of the container facing the advancing objects, a bottom surface of the container rearwardly inclined away from the advancing objects at a first acute angle with respect to vertical, and a sidewall of the container laterally inclined at a second acute angle with respect to vertical;

translating means for moving the container upwardly and downwardly along an axis defined by the intersection of said laterally inclined sidewall and said bottom surface; and a flat bottomed chute interposed between said conveyor system outlet and said container opening, said flat bottomed chute being designed to receive the randomly oriented advancing single objects individually and to lead each into the container in a predetermined orientation with respect to said bottom surface and said sidewall, said flat bottomed chute comprising a rectangular plate having a longitudinal edge, and a single reference rib projecting upwardly from said longitudinal edge, said plate being downwardly inclined, in the sense of the object motion, and tilted laterally, towards the single reference rib, in order to align a first edge of the advancing flat single objects with respect to the single reference rib by means of gravity and speed before the advancing article comes into contact with the container.

2. Device according to claim 1, further comprising a guard plate arranged between the chute and the opening of the container, parallel to the opening and below the chute, so as to form a guard for preventing an object falling into the container and rebounding against the bottom surface of the container from being ejected.

3. Device according to claim 1, wherein said support means comprises a bearing bracket for supporting the container in the loading position, said translating means comprises a shaped guide projecting externally from said bracket and slidable in a corresponding groove of an inclined column extending parallel to said axis, and said inclined column is rigidly fixed to said conveyor system.

4. Device according to claim 1, wherein said support means comprises a bearing bracket for supporting the container in the loading position, said translating means comprises a shaped guide projecting externally from said bracket and slidable in a corresponding groove of an inclined column extending parallel to said axis, and said inclined column is moveable with respect to said conveyor system.

5. Device according to claim 4, wherein said support means and said translating means are mounted on a carriage so as to form a mobile stacking system.

6. Device according to claim 1, wherein said flat objects are generally rectangular in configuration, said container has sidewalls generally perpendicular to said bottom surface, and said support means supports the container such that said laterally inclined sidewall is parallel to the reference rib, whereby a first edge of each of the flat objects is directed by gravity into contact with said bottom surface and an adjoining second edge is directed by gravity into contact with said laterally inclined sidewall.

7. Device according to claim 1, wherein said first acute angle is at least twenty degrees.

8. Device according to claim 1, wherein said second acute angle is at least twenty degrees.

9. Device according to claim 1, wherein said plate is downwardly inclined by at least twenty degrees.

10. Device according to claim 1, wherein said plate is tilted laterally by at least twenty degrees.

11. Device according to claim 1, wherein said first acute angle is at least twenty degrees, said second acute angle is at least twenty degrees, said plate is downwardly inclined by at least twenty degrees, and said plate is tilted laterally by at least twenty degrees.

12. Device according to claim 11, wherein said first acute angle is not more than thirty degrees, said second acute angle is not more than thirty degrees, said plate is downwardly inclined by not more than thirty degrees, and said plate is tilted laterally by not more than thirty degrees.

* * * * *